United States Patent [19]

Wakasugi et al.

[11] Patent Number: 5,629,821
[45] Date of Patent: May 13, 1997

[54] MAGNETIC HEAD

[75] Inventors: Makoto Wakasugi, Tokorozawa; Toshiro Atobe, Kitasaku-gun; Chiaki Hara; Naofumi Asanuma, both of Saku, all of Japan

[73] Assignees: Citizen Watch Co., Ltd.; Cimeo Precision Co., Ltd., both of Japan

[21] Appl. No.: 404,906

[22] Filed: Mar. 15, 1995

[30] Foreign Application Priority Data

Mar. 17, 1994 [JP] Japan .................................. 6-071276

[51] Int. Cl.$^6$ ........................................ G11B 5/17
[52] U.S. Cl. ............................... 360/125; 360/121
[58] Field of Search ............................. 360/103, 104, 360/105, 121, 122, 123, 125, 126

[56] References Cited

U.S. PATENT DOCUMENTS

| | | | |
|---|---|---|---|
| 2,931,864 | 4/1960 | Moehring et al. | 360/125 |
| 3,501,756 | 3/1970 | Woods et al. | 360/123 |
| 5,459,629 | 10/1995 | Wakasugi | 360/104 |

FOREIGN PATENT DOCUMENTS

| | | | |
|---|---|---|---|
| 3-250408 | 4/1991 | Japan | 360/125 |
| 3-245309 | 10/1991 | Japan | 360/125 |
| 5-509147 | 11/1991 | Japan . | |
| 4-126315 | 11/1992 | Japan . | |
| 5-135323 | 6/1993 | Japan . | |
| 5-135322 | 6/1993 | Japan | 360/125 |
| 5-282624 | 10/1993 | Japan | 360/125 |
| 5-298648 | 11/1993 | Japan . | |
| 5-290312 | 11/1993 | Japan . | |
| 5-325131 | 12/1993 | Japan . | |
| 6-195621 | 7/1994 | Japan | 360/125 |

*Primary Examiner*—Stuart S. Levy
*Assistant Examiner*—Paul J. Ditmyer
*Attorney, Agent, or Firm*—Dickstein Shapiro Morin & Oshinsky LLP

[57] ABSTRACT

A pair of parallel frame members 30 and 31 are formed in the inner bobbin faces of recording/reproducing and erasing coil assemblies 3, 4 on the opposite sides and spaced equidistant from a core tip center line T. An orthogonal frame member 32 is formed on the outer side of each of the bobbin end face to extend in a direction perpendicular to the parallel frame members 30 and 31. The end of the orthogonal frame member 32 extending toward an auxiliary sliding face 15 of a slider 2 extends outwardly from one of the parallel frame members 31. The recording/reproducing and erasing coil assemblies 3 and 4 are disposed asymmetrically to each other about the core tip center line T. When the recording/reproducing and erasing coil assemblies 3 and 4 are respectively housed in coil assembly receiving portions 26 and 27, the coil assemblies 3 and 4 will not extend outwardly beyond a slider plane projection line C.

11 Claims, 12 Drawing Sheets

MAGNETIC HEAD

BACKGROUND OF THE INVENTION

1. Field of the Invention

The present invention relates to a magnetic head and particularly to a composite type magnetic head suitable for use in small-sized and thin floppy disc drives (FDD) and the like, in which recording/reproducing and erasing heads are combined together.

2. Description of the Prior Art

There are known composite type magnetic heads which are used to carry out recording and reproducing on magnetic recording media such as floppy discs and the like and in which recording/reproducing and erasing heads are combined together. As the floppy disc drives and the like are being formed into a reduced thickness equal to or smaller than one inch and into a decreased size equal to or smaller than 3.5 inches, such magnetic heads are also required to be reduced in thickness and size.

Such composite type magnetic heads must be manufactured with higher dimensional precision since any manufacturing tolerance in the magnetic heads themselves may cause variability in electromagnetic transducing characteristics of the recording and reproducing process, resulting in limitations to the compatibility with other machines. The magnetic heads are further required to have reduced mass for providing an improved follow-up property relative to the recording face of the floppy disc, but must conflictingly have sufficients strength for any external impact. If the FDD is mounted in a portable computer, its magnetic head should also be improved in magnetic efficiency to reduce the power consumption. From the viewpoint of manufacturing cost, the magnetic heads must be produced through a simplified process. To meet such requirements, the prior art has improved such magnetic heads in various forms.

There are also known so-called bulk type magnetic heads which comprise a ceramic slider slidably contacting the recording face of a magnetic recording medium and a gimbal spring for supporting the slider on a carriage. The interior of the slider includes a composite magnetic core for forming recording/reproducing and erasing gaps, a recording/reproducing coil assembly mounted in the magnetic core, an erasing coil assembly mounted in the magnetic core and a back bar for magnetically closing the open end of the magnetic core.

One of such magnetic heads has been proposed by the applicant and is disclosed in Japanese Patent Laid-Open No. He/5-135323. This is a composite type magnetic head including two back bars which are suitable for improving the magnetic efficiency, reducing the power consumption and decreasing the thickness and size. This magnetic head will now be described in detail with reference to FIGS. 1 to 6.

Referring first to FIG. 1, a magnetic head 100 is assembled on and supported by a gimbal spring 101 which is in turn fixedly mounted on a carriage (not shown). The magnetic head 100 is fixed to the outer face of the gimbal spring 101, with the coil terminals 102 thereof extending through the gimbal spring 101 to the inner face thereof. The gimbal spring 101 also fixedly supports a core shield (not shown) which surrounds the exterior of the magnetic head 100 to block the magnetism. The inner face of the gimbal spring 101 includes a wiring sheet applied thereto for connecting the coil terminals 102 of the magnetic head 100 to an FDD control circuit. The wiring sheet 103 includes an opening 104 formed therethrough, part of which is disposed opposite to the central portion 105 of the magnetic head 100. The central portion 105 receives a pivot fixed to a carriage.

FIGS. 2 and 3 are perspective views of the magnetic head 100. Particularly, FIG. 2 is a perspective view showing parts of the internal members. The magnetic head 100 comprises a slider 106, a magnetic core 107 at least part of which is received in the interior of the slider 106, recording/reproducing and erasing coil assemblies 108, 109 mounted in the magnetic core 107 and back bars 110 for magnetically closing the open end of the magnetic core 107.

The slider 106 is formed as a ceramic unit and includes main and auxiliary sliding faces 111, 112, on the surface of the slider 106 adapted to face a magnetic recording medium, which are formed into lands slightly raised from the surrounding surface. These sliding faces 111 and 112 are adapted to slidably contact the surface of a magnetic recording medium. The main sliding face 111 includes a slit 113 through which the magnetic core 107 is inserted into the slider 106.

FIG. 4 shows the details of the magnetic core 107. The magnetic core 107 is a composite core having recording/reproducing and erasing cores 114, 115. Each of the cores 114 or 115 includes an outer core 114a or 115a and an inner core 114b or 115b. The outer and inner cores 114a, 114b or 115a, 115b are connected to each other through a given gap. These gaps form a recording/reproducing gap 116 in the recording/reproducing core 114 and erasing gaps 117 in the erasing core 115. The inner cores 114b and 115b are bonded to each other through glass or adhesive. With a magnetic head for 3.5 inch-1 MB recording media, the dimensions of the composite magnetic core 107 are set to be about 3.8 mm in length and about 0.3 mm in width ($t_c$). The width of the recording/reproducing gap 116 is equal to 131±5 µm while the width of the erasing gaps 117 is equal to 71±5 µm. The two erasing gaps 117 are disposed on the opposite sides of the locus of the recording/reproducing gap and spaced away from each other by a spacing equal to 117±5 µm. A glass part of 20–30 µm is provided outside each of the erasing gaps 117.

FIG. 5 is an exploded and perspective view of the magnetic head 100. The slider 106 includes noses 118 and 119 formed therein to extend from the centers of the opposite inner walls to the magnetic core 107 and adapted to position the composite magnetic core 107. Each of the noses 118 and 119 has a step 118a or 119a for receiving the corresponding one of back bars which will be described later. The top of each of the noses 118 and 119 (as viewed in FIG. 5) is lowered slightly from the top of the corresponding side wall in the slider 106 to form a recessed face 118b or 119b. As shown in FIG. 6, a mass of silver paste is applied to a gap between this recessed face 119b and the gimbal spring 101 to bond them together. This prevents any vibration or judder which may be produced between the gimbal spring 101 and the slider 106.

Coils are wound about the outer cores 114a and 115a in the recording/reproducing and erasing cores of the magnetic core 107. In the embodiment of FIG. 5, conductor wires are wound about coil bobbins 120 and 121 to form coils 122 and 123. The coil bobbins 120 and 121 include bores 124 and 125 formed therethrough into which the legs of the outer cores 114a and 115a are inserted to complete the coil assemblies 108 and 109. In the embodiment of FIG. 5, the coil bobbins 120 and 121 are of the same configuration, and injection molded from a fiber reinforcing plastic which mainly contains polyphenylene sulfide. A core chip center line T, which is the center line of the magnetic core 107 in the direction of thickness, passes through the center of the bores 124 and 125. Parallel frame members 128, 129 or 130, 131 are formed on the inner end of each of the coil bobbins 120 or 121 at the opposite sides and disposed symmetrically relative to each other about the core chip center line T. Orthogonal frame members 132 and 133 are also formed on the inner ends of the respective coil bobbins 120 and 121 at the outer sides and extend in a direction perpendicular to the parallel frame members 128, 129 and 130, 131. These orthogonal frame members 132 and 133 are disposed symmetrically relative to each other about the core chip center line T. The opposite ends 132a, 132b or 133a, 133b of each of the orthogonal frame members 132 or 133 extend laterally beyond the parallel frame members 128, 129 or 130, 131.

Each of the orthogonal frame members 132 or 133 includes three terminals 134, 135, 136 or 137, 138, 139 which are insert molded to extend upwardly beyond the orthogonal frame member. The ends of the coils 122 and 123 are preliminarily soldered and connected to the respective terminals 134–139. Among the three terminals of the erasing coil assembly 109, the central terminal 138 is not wound by the coil end. Each of the parallel frame members 128–131 includes a vertically extending ridge 140, 141, 142 or 143 formed thereon at the central and inner face thereof. The ridge is of semi-circular cross-section having a radius of about 0.3 mm and has a sloped top. An opening 144, 145, 146 or 147 is formed between this ridge 140–143 and the corresponding coil end 126 or 127. Such an opening can cause an appropriate urging force to be effectively applied to the back bars which are inserted between the ridges and the legs of the composite magnetic core 107, as will be described later.

The back bars 110a and 110b are adapted to magnetically close the open end of the composite magnetic core 107. The back bars 110a and 110b are formed of a ferrite material similar to that of the composite magnetic core 107. The back bars 110a and 110b have a thickness ($B_1$, $B_2$) ranging between about 0.4 mm and about 0.8 mm and a height ranging between about 0.4 mm and 0.8 mm. The length of each back bar is equal to or slightly longer than that of the magnetic core 107. When the back bars 110a and 110b are inserted while being guided along the sloped tops of the ridges 140 to 143, the tops of the ridges will be shaved by the back bars 110a and 110b. Shavings thus produced can escape through the openings 144–147.

The implications of the fact that the ridges 140–143 are shaved by the back bars 110a and 110b on assembling will be described.

The dimensional tolerances in the coil bobbins 120 and 121, back bars 110 and 110b and composite magnetic core 107 are ±20 μm, ±5 μm and ±5 μm, respectively. The fit tolerance of the back bars 110a and 110b obtained by such a combination becomes equal to ±30 μm. The gap in the interface between each of the back bars 110a or 110b and the composite magnetic core 107 must be equal to or less than 1 μm to suppress increase of the magnetic resistance. If the fit allowance in each of the back bars 110a or 110b is set to be between 20 μm and 80 μm, therefore, a substantially large distortion will be created in the composite magnetic core 107 when the ridges 140–143 are not shaped with an increased fit allowance. This reduces the magnetic permeability to provide an insufficient flow of magnetic flux, resulting in degradation of the reproducing and writing efficiencies.

If the ridges 140–143 are not shaved, the top ends of the parallel frame members 128–131 will be widened to degrade the adhesion when the back bars 110a and 110b are assembled into the magnetic head.

By shaving the ridges 140–143 when the back bars 110a and 110b are assembled into the magnetic head, no large force will be applied to the composite magnetic core 107, avoiding the above problem. This can cause the back bars 110a and 110b to be brought into intimate contact with the composite magnetic core 107 without any distortion.

In such a manner, the back bars 110a and 110b are temporarily connected to the opposite sides of each leg in the composite magnetic core 107 as shown in FIG. 3 before they are finally adhered to the legs using the silver paste as shown in FIG. 6 the magnetic head of the prior art which did not use a pair of back bars, a single back bar was only press-fitted into the magnetic head on the side of the main sliding face. In such a case, the thickness of the back bar was larger than that of the magnetic core to suppress increase of the magnetic reluctance. To further reduce the magnetic resistance, the use of two back bars has been proposed. However, such back bars are still of rectangular solid form having the same thickness as before the proposal. Such a back bar was located directly on the side of the auxiliary sliding face. In such a case, the back bar on the side of the auxiliary sliding face will reach a position adjacent to the center of the head. If an impact is exerted on the magnetic head in such a position, the back bar will be urged by the gimbal spring 101 under the pivot of the carriage. The back bar may be broken, thus opening the magnetic circuit or damaging the coil below that back bar, or to producing a shortcircuit. To avoid such risks, the recessed face 119b will be formed adjacent the central portion of the gimbal spring 101 pivoted to provide a gap in which the nose 119 on the side of the auxiliary sliding face is applied to the gimbal spring 101. At the same time, the back bar 110b includes a notch 148 for avoiding the step 119a of the nose 119.

In the aforementioned magnetic head of the prior art, the recording/reproducing and erasing coil assemblies 108, 109 are of a configuration symmetrical about the core tip center line T. When such recording/reproducing and erasing coil assemblies 108, 109 are housed within the slider 106, the end portions 132a, 132b and 133a, 133b of the orthogonal frame members 132 and 133 in the recording/reproducing and erasing coil assemblies 108, 109 will extend outwardly beyond the outer periphery of the slider 106, that is, the plane projection line of the slider 106. When the outer peripheral wall of the slider is shielded, the width of the slider 106 including the magnetic head shield in the seek direction cannot be reduced. In addition, the volume occupied by the upper and lower magnetic heads disposed one above another about the magnetic recording medium will be increased. If the end portions of the orthogonal frame members 132 and 133 further extend outwardly beyond the slider 106, then when the terminals of the orthogonal frame members 132 and 133 are to be wound by the conductor wires of the recording and erasing coils 122, 123, the orthogonal frame members 132 and 133 will be flexed to obstruct the connection of the coil wires.

The terminals 134–139 extend upwardly beyond the tops of the orthogonal frame members 132 and 133 in the recording/reproducing and erasing coil assemblies 108, 109. These terminals 134–139 extend through the gimbal spring 101 to the contact patterns of the wiring sheet 103 which are soldered to the terminals. This will increase the thickness of the magnetic head.

When the terminals 134–139 are to be passed through the holes of the gimbal spring 101 on assembling, the terminals 134–139 may damage the coil wires (which are 30–50 μm in diameter and 1–3 μm in film thickness) to disconnect them. This raises a problem in that such disconnections may first come to light in the market.

The formation of notches in the back bars increases the number of manufacturing steps, resulting in increase of the manufacturing cost. Furthermore, a stress tends to concentrate into the back bars to break them, or requiring the troublesome judgment as to whether or not the back bars to be assembled are properly directed. Since the back bars have their increased thickness to increase the strength, the expensive magnetic core which is more expensive than the back bars tends to be broken at its legs (particularly at the central leg) when a relatively large force is applied to the back bars on assembling.

SUMMARY OF THE INVENTION

It is therefore an object of the present invention to provide a high-performance and inexpensive magnetic head which is suitable for use in thinner and/or small-sized FDD's.

Another object of the present invention is to provide a magnetic head which can reduce not only the width of the head body in the seek direction, but also the volume occupied by the upper and lower magnetic heads.

Still another object is to provide a magnetic head in which the coil wires can be more efficiently connected to the terminals.

A further object is to provide a magnetic head which can not only reduce its own thickness, but also improve the soldering property to overcome a risk that the disconnection of the coil wires in the magnetic head is first discovered in the market.

A further object is to provide a magnetic head in which damage to the core legs is reduced when the back bars are assembled into the magnetic head.

To this end, the present invention provides a magnetic head comprising a magnetic core having gaps formed along a direction transversing the longitudinal axis of the magnetic core, a slider having a main sliding face brought into sliding contact with a magnetic recording medium and fixedly supporting the magnetic core with the gap thereof being exposed through the main sliding face, a coil through which part of the magnetic core is passed and a coil bobbin for holding the coil. The coil bobbin comprises a bobbin body holding the coil, two parallel frame members formed in the bobbin body on the side opposite to the magnetic recording medium and disposed on the opposite sides of the magnetic core to extend parallel to each other in the longitudinal direction of the magnetic core and be spaced away from each other, an orthogonal frame member formed to extend in a transverse direction perpendicular to the longitudinal direction of the magnetic core and located in contact with the end portions of one of the two parallel frame members, the orthogonal frame member having at only one end an extension extending outwardly beyond the two parallel frame members, and terminals formed to extend from the orthogonal frame member and wound by the ends of the coil conductor wires. The coil bobbin is housed within the slider with respect to both the longitudinal and transverse directions of the magnetic core except the terminals. Thus, the outline of the head can be reduced.

If the slider has an auxiliary sliding face which is disposed parallel to the main sliding face in the longitudinal direction of the magnetic core and also has an auxiliary sliding face slidingly contacts the magnetic recording medium, the extension of the orthogonal frame member extends toward the auxiliary sliding face. Thus, when the magnetic core is offset from the center line of the slider, the orthogonal frame member including the terminals can be shifted toward the center line of the slider. Even if the slider is reduced in size, the coil bobbin can be housed within the slider.

It is also preferred that a reinforcing beam is located between the extension of the orthogonal frame member and one of the parallel frame members. In such a case, the extension of the orthogonal frame member can be prevented from flexing. When the coil conductor wire is to be wound about the terminals, such an operation can be facilitated.

It is further preferred that the terminals extend outwardly from the orthogonal frame member in the longitudinal direction of the magnetic core at at least the opposite ends of the orthogonal frame member. In such a case, the magnetic head can be reduced in thickness. When the terminals are to be passed through holes in a gimbal spring on which the magnetic head is placed, the coil conductor wire wound about the terminals can be prevented from being disconnected.

It is further desirable that the terminals are bent toward the side of the coil bobbin opposite to the magnetic recording medium. When the terminals are to be connected to a wiring sheet in the gimbal spring on which the magnetic head is placed, the terminals can be located more adjacent to the wiring sheet, resulting in facilitation of the wiring operation.

It is further preferable that the terminals have their tips disposed parallel to the main sliding face of the slider. Since the main sliding face of the slider is substantially parallel to the gimbal spring having the wiring sheet, therefore, the portions of the terminals parallel to the wiring sheet can increase an area contributing to the soldering of the terminals, resulting in more reliable connection.

The present invention also provides a magnetic head comprising a magnetic core including gaps formed along a direction transversing the longitudinal axis of the magnetic core, a slider having a main sliding face brought into sliding contact with a magnetic recording medium, said slider fixedly supporting said magnetic core with the gap thereof being exposed at the main sliding face, a coil through which part of the magnetic core extends, a coil bobbin for holding said coil and two back bars disposed between said two parallel frame members for magnetically closing the other open end of the magnetic core and for holding the magnetic core, each of the back bars being in the form of a rectangular solid having a uniform cross-sectional configuration in the longitudinal direction. The provision of two back bars can reduce their own magnetic resistance. The uniform cross-sectional configuration of these back bars means that there is no notch, resulting in reduction of the manufacturing cost and possible damage.

It is further preferred that the thickness of the back bars in the transverse direction of the magnetic core is less than the thickness of the magnetic core in the transverse direction and more than one-half of this thickness of the magnetic core. When the thickness of the back bars is smaller than that of the magnetic core, the strength of the back bars will be lower than that of the magnetic core. When the back bars are inserted into the magnetic head and even if an excessive stress is created in the back bars and magnetic core, the inexpensive back bars will be damaged earlier. Therefore, the expensive magnetic core can be protected from being damaged, also resulting in reduction of the manufacturing cost.

If the two back bars are of the same configuration, the manufacturing cost can be further reduced.

DESCRIPTION OF THE PREFERRED EMBODIMENTS

Figure 1:
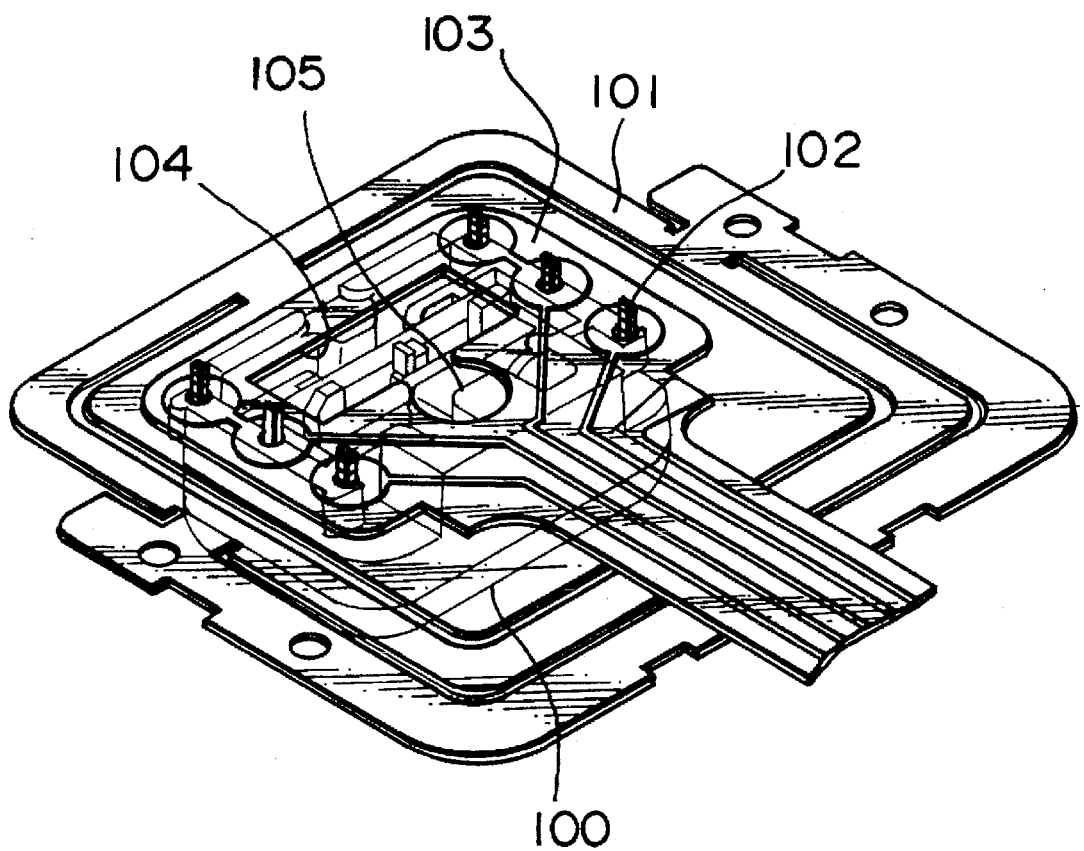
FIG. 1 is a view showing a magnetic head according to the prior art which is mounted on a gimbal spring.
Figure 2:
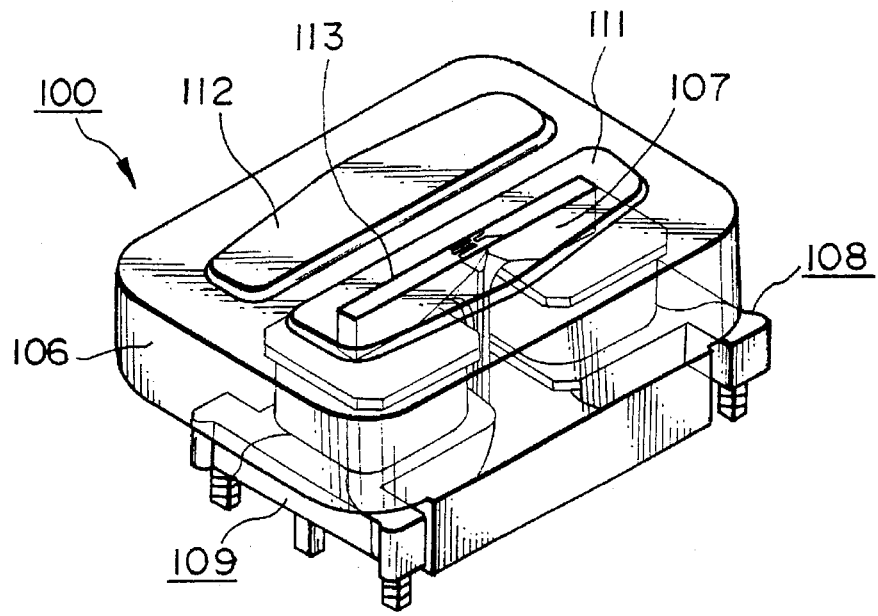
FIG. 2 is a schematic and perspective view showing the outer side of the magnetic head according to the prior art.
Figure 3:
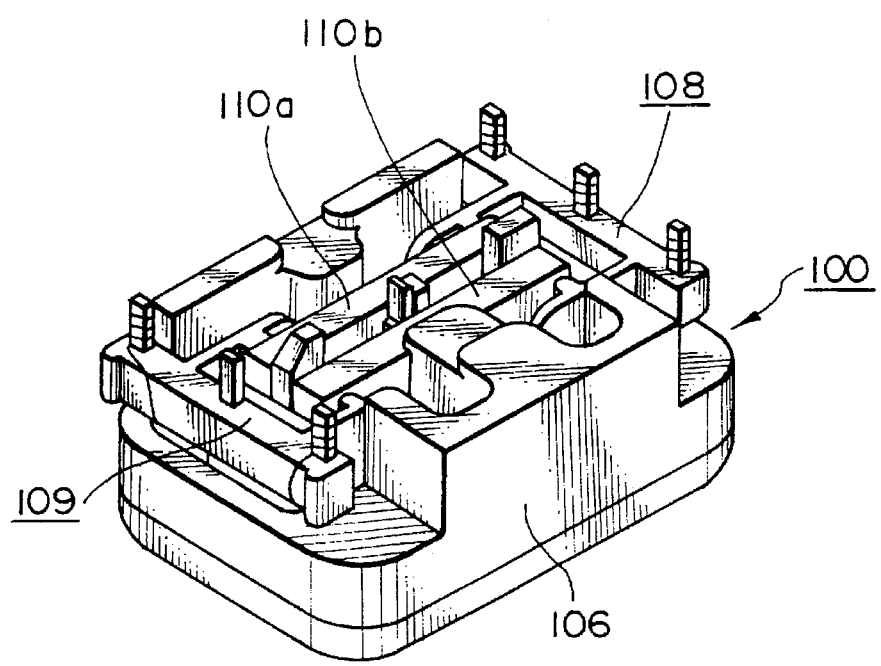
FIG. 3 is a schematic and perspective view showing the inner side of the magnetic head according to the prior art.
Figure 4:
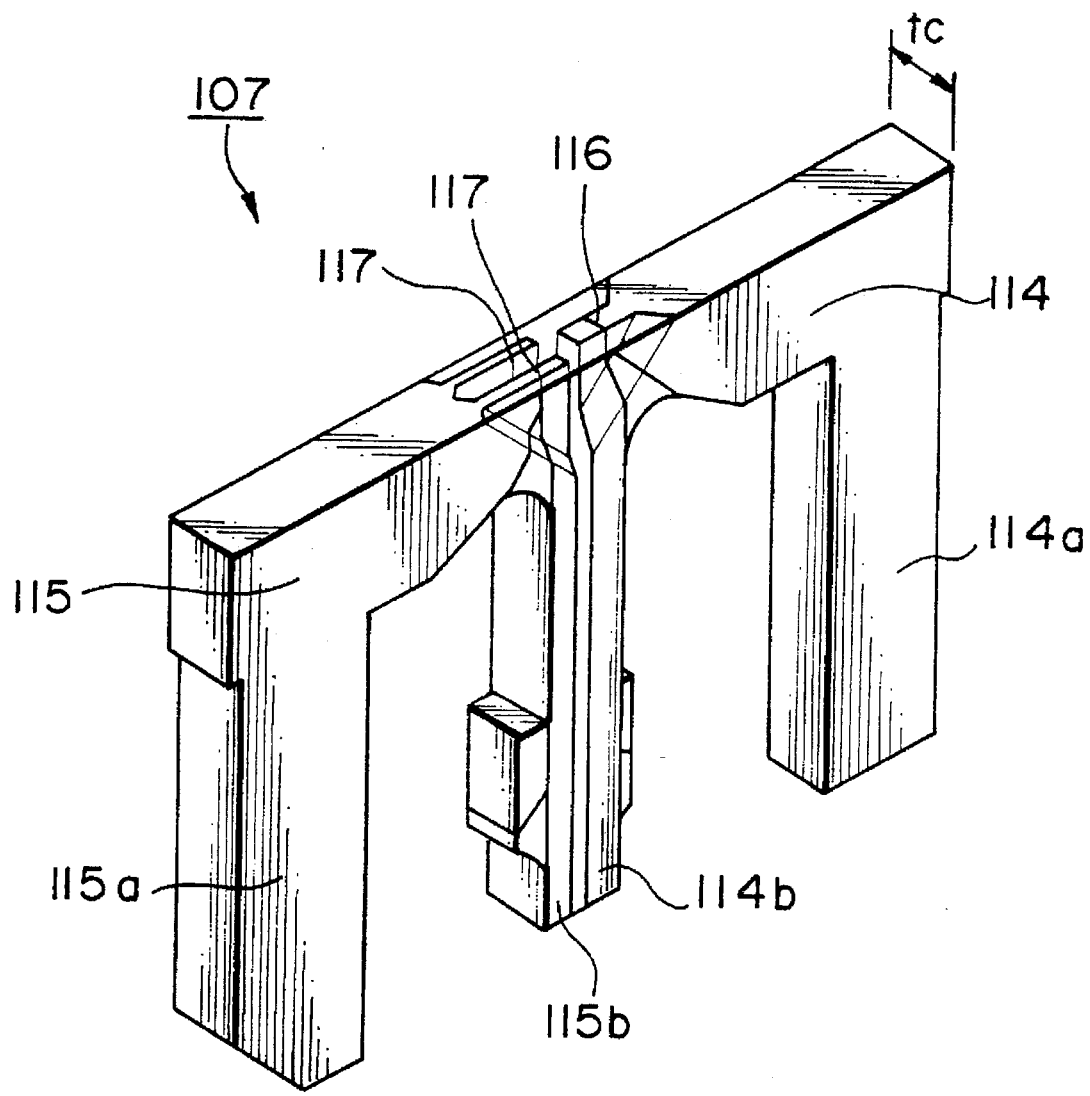
FIG. 4 is a schematic and perspective view of the magnetic core according to the prior art.
Figure 5:
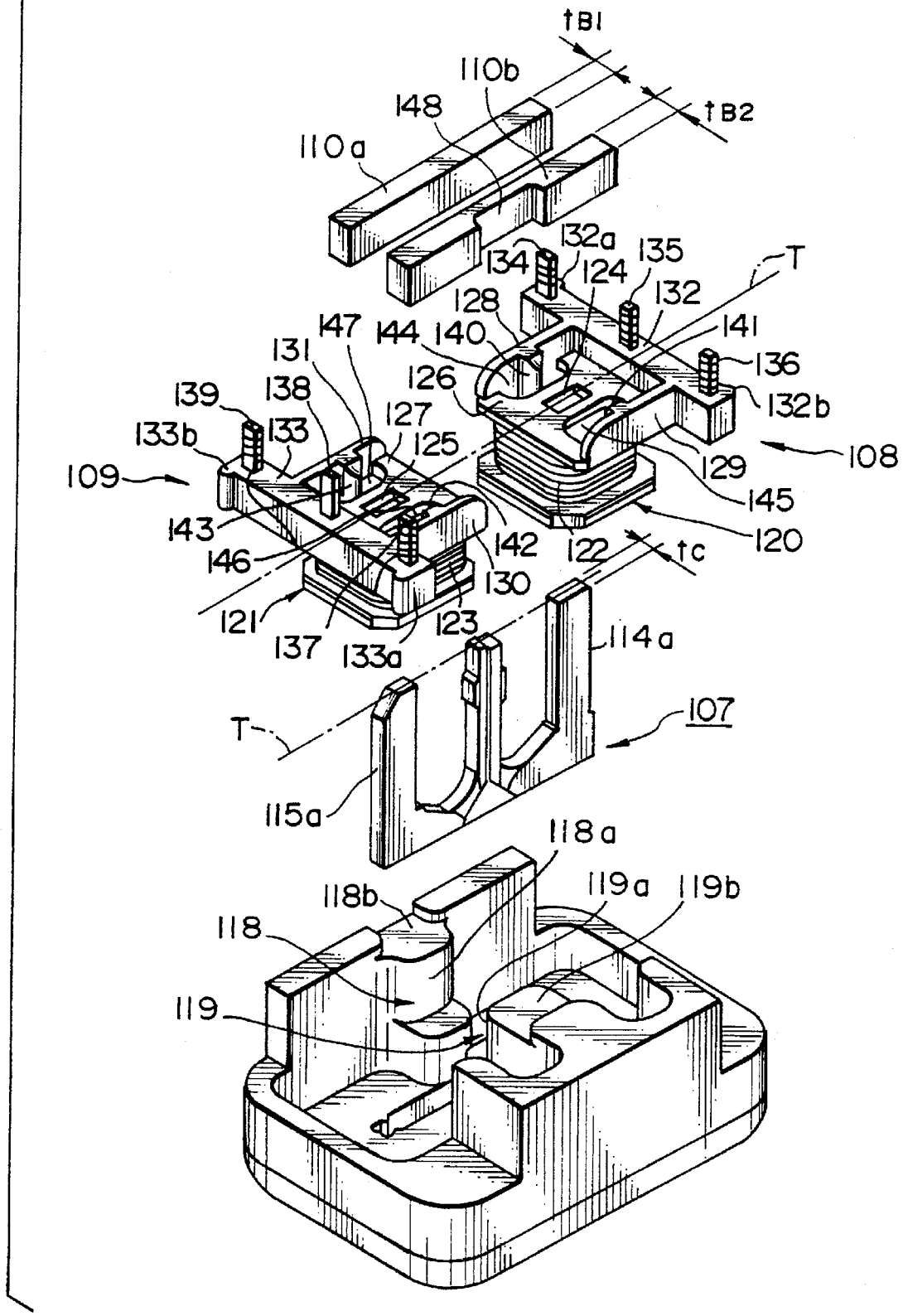
FIG. 5 is an exploded and perspective view of the magnetic head according to the prior art.

The present invention will now be described in connection with some preferred embodiment illustrated in the drawings.

Figure 7:
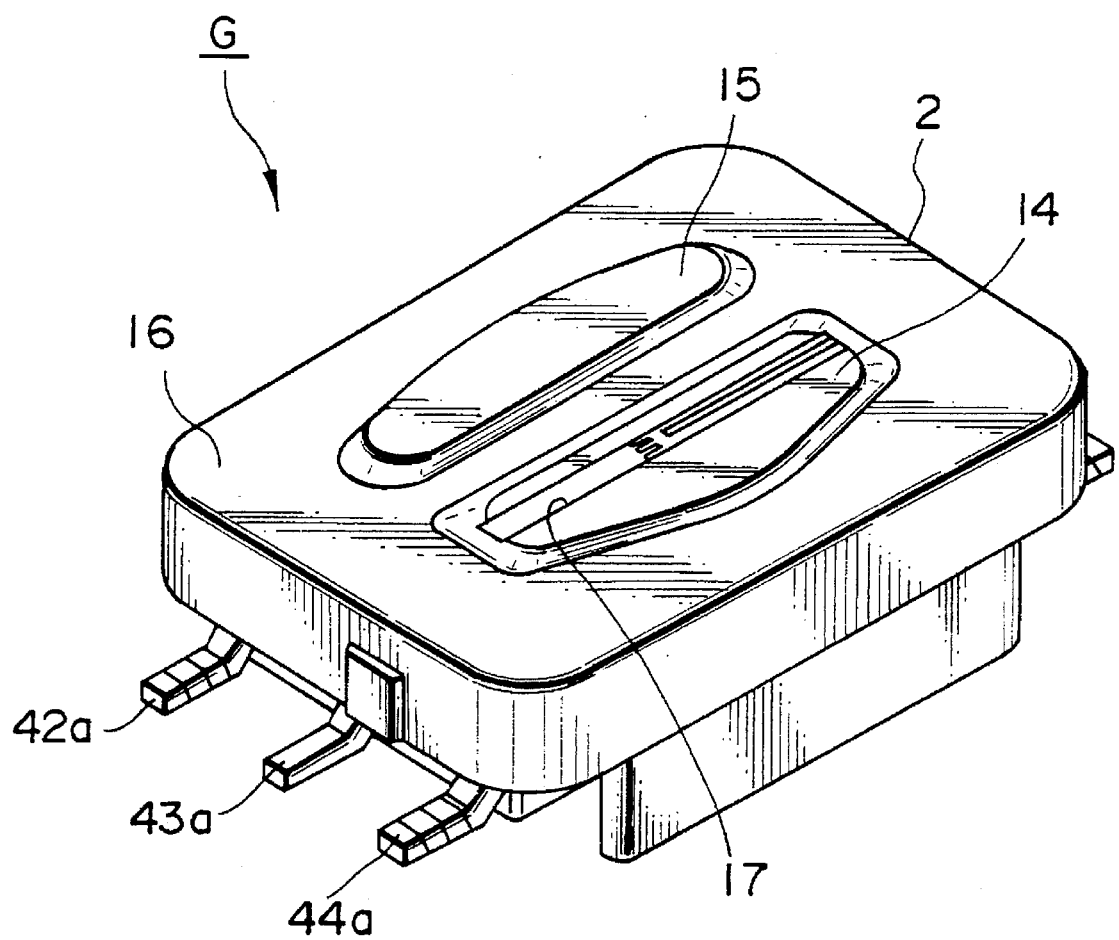
FIG. 7 is a schematic and perspective view showing the outer side of one embodiment of a magnetic head constructed according to the present invention.
Figure 8:
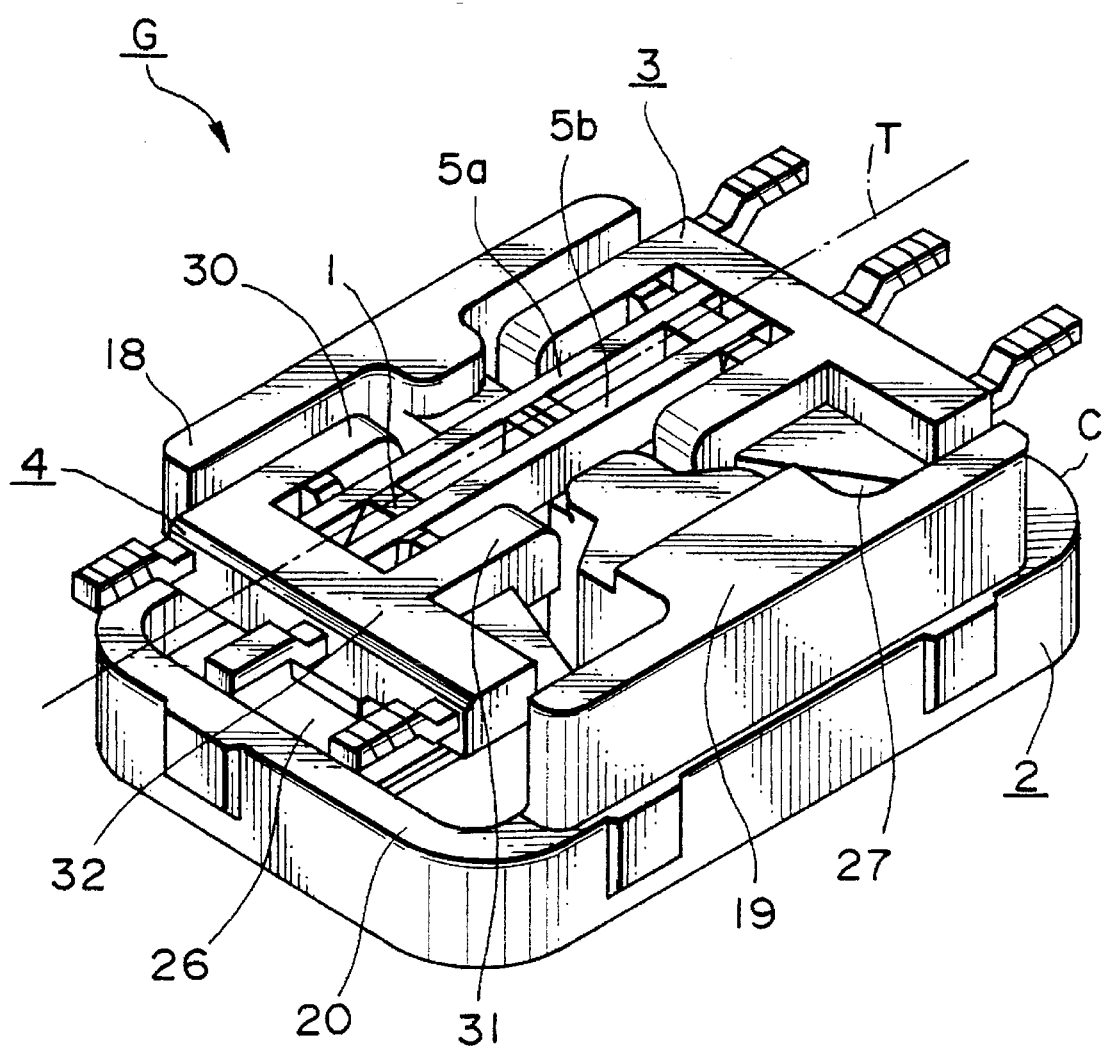
FIG. 8 is a schematic perspective view of the inner side of the magnetic head shown in FIG. 7.
Figure 9:
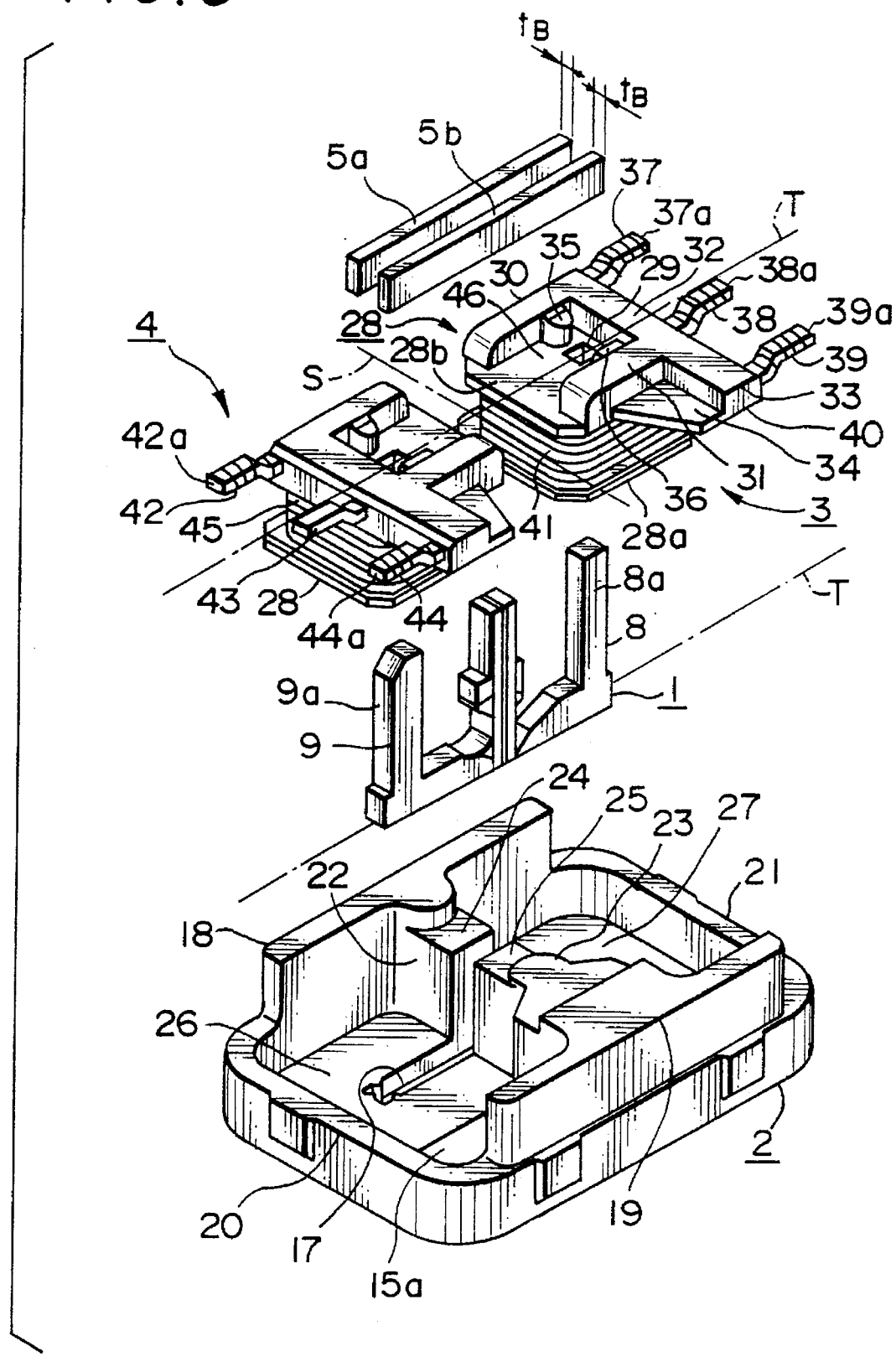
FIG. 9 is an exploded and perspective view of the magnetic head shown in FIG. 7.

FIGS. 7 and 8 are schematic and perspective views of one embodiment of a magnetic head G constructed according to the present invention. FIG. 9 is an exploded and perspective view of the magnetic head G.

The magnetic head G mainly comprises a composite magnetic core 1, a slider 2, a recording/reproducing coil assembly 3, an erasing coil assembly 4, back bars 5a, 5b and a gimbal spring 48.

Figure 10:
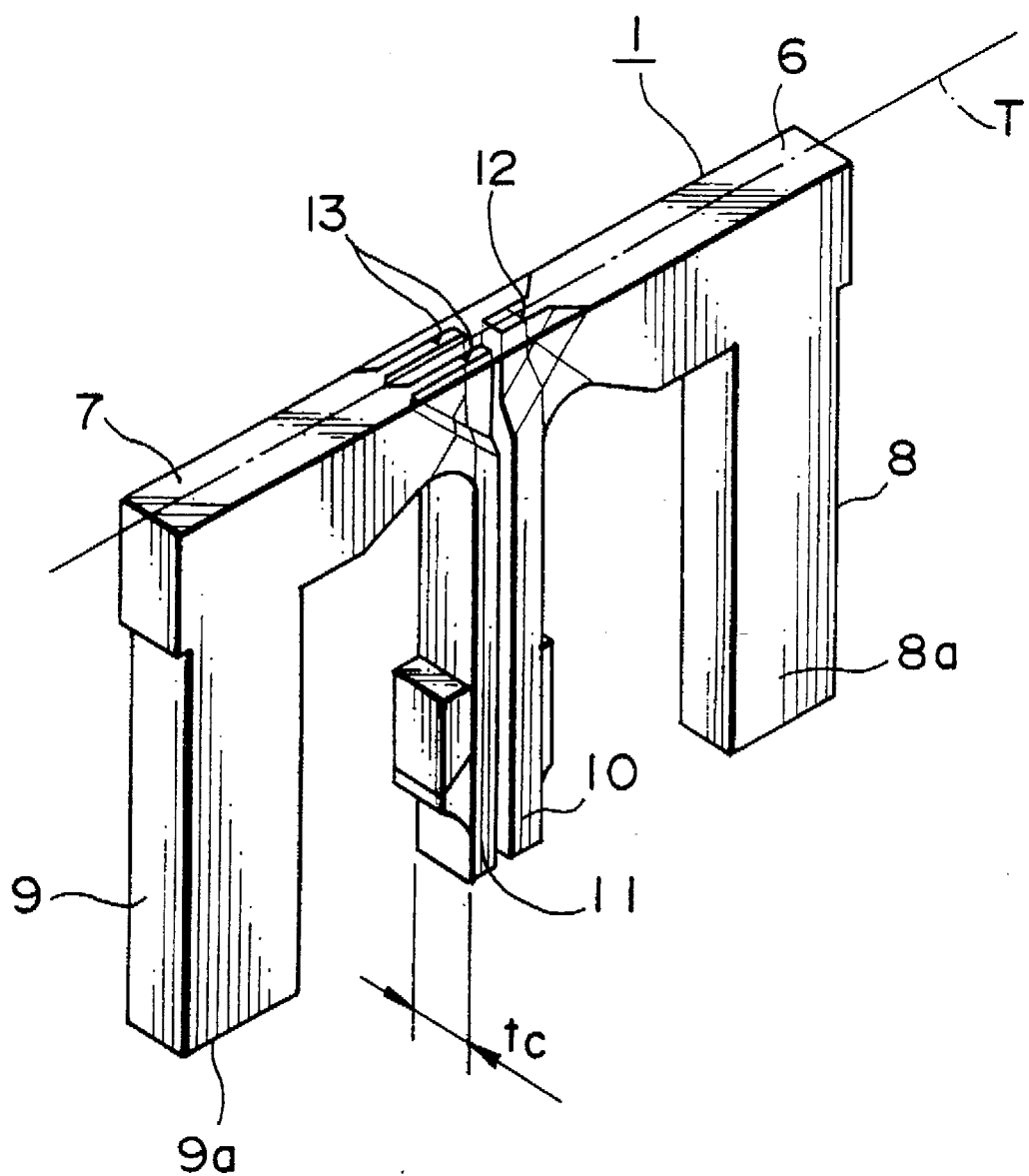
FIG. 10 is a schematic perspective view of the magnetic core shown in FIG. 7.
Figure 11:
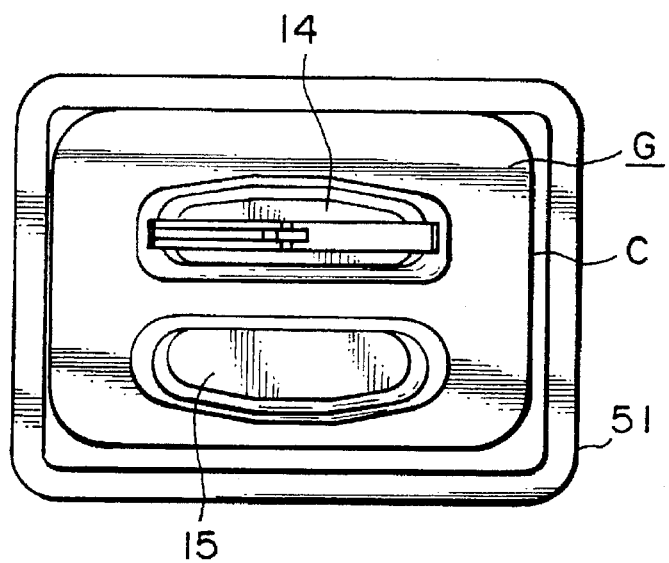
FIG. 11 is a plane view of the magnetic core on which the shield member shown in FIG. 7 is mounted.
Figure 12:
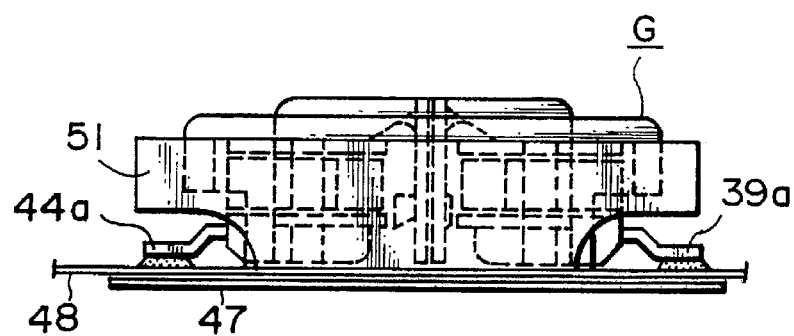
FIG. 12 is a front view of the magnetic core shown in FIG. 11.
Figure 13:
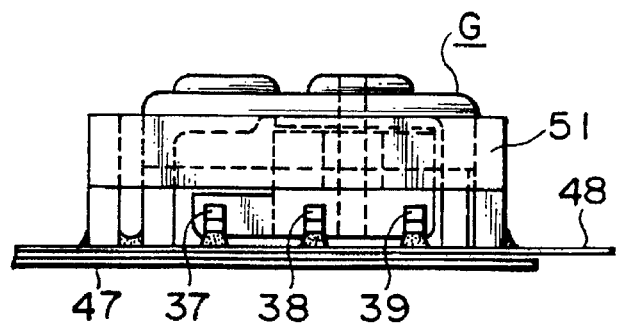
FIG. 13 is a side view of the magnetic core shown in FIG. 11.
Figure 14:
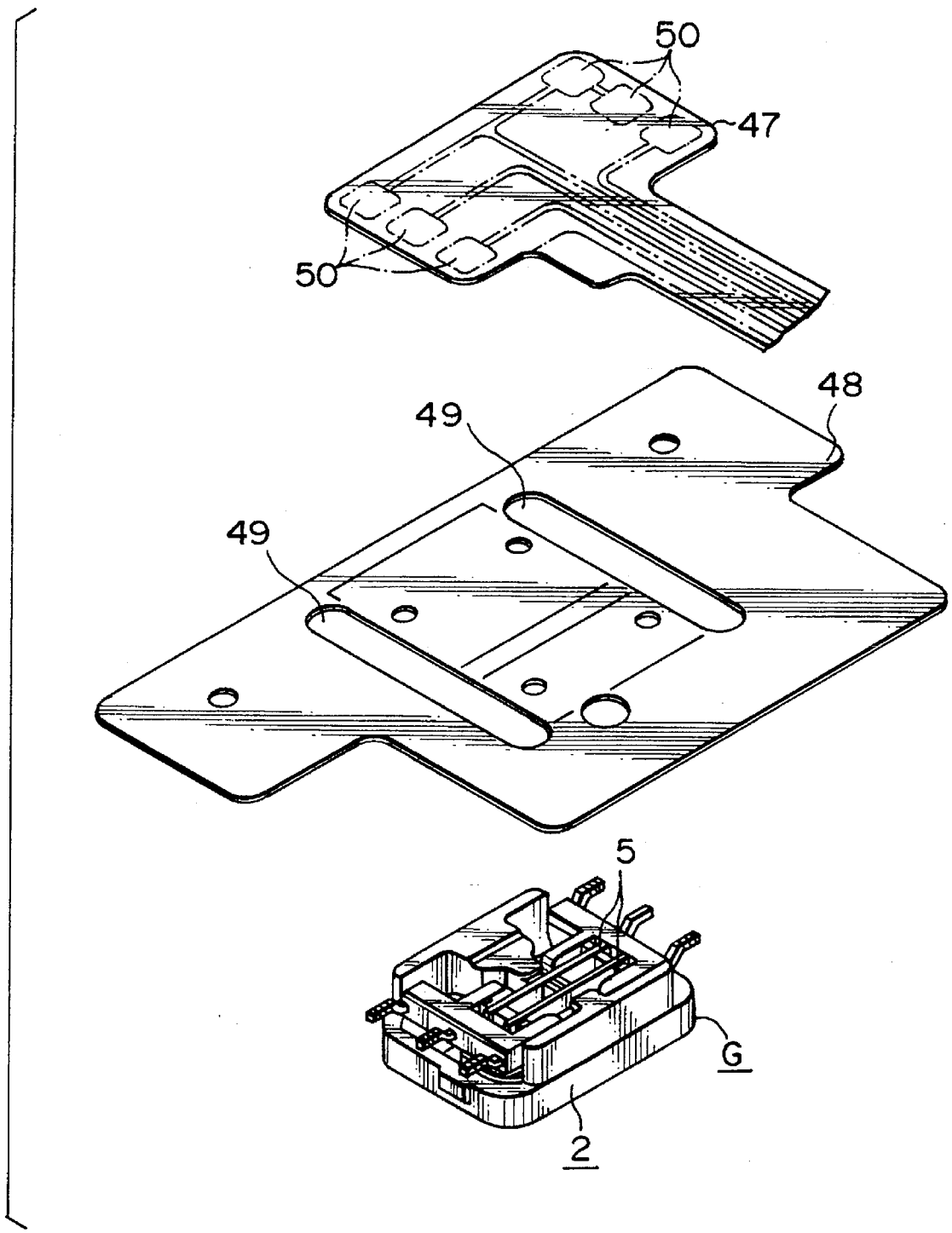
FIG. 14 is a schematic and perspective view showing the magnetic head with a gimbal spring on which the magnetic head is mounted and a wiring sheet formed thereon.

The composite magnetic core 1 is formed by a recording/reproducing core 6 and an erasing core 7 as a unit, as shown in FIG. 10. Each of the cores 6 or 7 includes an outer core 8 or 9 extending through the corresponding coil and an inner core 10 or 11 for closing the magnetic fluxes. The inner cores 10 and 11 are integrally connected to each other through a glass adhesive. The recording/reproducing core 6 is formed with a recording/reproducing gap 12 while the erasing core 7 is formed with an erasing gap 13 for erasing data which has been recorded on a magnetic recording medium at the opposite track ends thereof by the recording/reproducing core 6. The center line of the composite magnetic core 1 in the direction of thickness is a core tip center line T.

The slider 2 is a single unit injection molded from calcium titanate. The slider 2 includes main and auxiliary sliding faces 14 and 15. The main sliding face 14 is brought into contact with the recording face of the magnetic recording medium to perform the recording/reproducing and erasing operations with the composite magnetic core 1. The auxiliary sliding face 15 is spaced parallel away from the main sliding face 14 in the direction of the recording medium track. The slider 2 also includes a reference relief face 16 which is formed to surround the main and auxiliary sliding faces 14 and 15 and recessed slightly from these sliding faces. In other words, the main and auxiliary sliding faces 14 and 15 are of a trapezoidal cross-section raised slightly from the reference relief face 16 and also of an elongated and outwardly convexed half-moon configuration. As is well-known, the main and auxiliary sliding faces 14 and 15 will co-operate with the main and auxiliary sliding faces of another magnetic head disposed on the opposite side of the magnetic recording medium.

The slider 2 further includes a core slit 17 for exposing the gaps 12 and 13 of the composite magnetic core 1 outwardly through the main sliding face 14, the core slit 17 extending in the longitudinal direction of the slider 2. The slider 2 further includes first and second side walls 18, 19 which extend parallel to the core slit 17 in the longitudinal direction of the slider 2 and first and second end walls 20, 21 which extend in the transverse direction of the slider 2 and are lowered from the first and second side walls 18, 19. The first and second side walls 18, 19 as well as the first and second end walls 20, 21, form an outer slider periphery which forms a plane projection line C when it is projected onto a plane, as shown in FIG. 8.

The central portion of the first side wall 18 includes a nose 22 extending toward the core slit 17 while the central portion of the second side wall 19 includes a nose 23 also extending toward the core slit 17. When the composite magnetic core 1 is fixedly mounted in the slider 2, these noses 22 and 23 can hold and position the composite magnetic core 1 at a proper position relative to the slider. Back bar receiving portions 24 and 25 are formed in the noses 22 and 23 inside of the head in the form of steps. The inside of the slider 2 includes coil assembly receiving portions 26 and 27 separated by the noses 22 and 23, as shown in FIG. 8. The inner faces of the coil assembly receiving portions 26 and 27 are increased in thickness at a location corresponding to the inner wall 15a of the auxiliary sliding face 15 to avoid any deformation in the coil assembly receiving portions 26 and 27 when the binder is to be removed.

The recording/reproducing coil assembly 3 includes a coil bobbin 28 having a bobbin body 28a about which a conductor wire is wound to form a coil. The coil core has a bore 29 formed therethrough. The bore 29 receives the leg 8a of the outer core 8 in the recording/reproducing core 6 of the composite magnetic core 1. The inner face 28b of the bobbin body 28a (which is the outer face as viewed in FIG. 8) is formed, on the opposite sides, with a pair of parallel frame members 30 and 31 each spaced equidistant from the core tip center line T. The outer side of the inner face 28b is formed with an orthogonal frame member 32 which extends in a direction perpendicular to the parallel frame members 30 and 31. One end of the orthogonal frame member 32, which is on the side of the auxiliary sliding face 15, extends outwardly beyond the parallel frame member 31 to form an extension 33. A reinforcing beam 34 is formed between the extension 33 and the parallel frame member 31 to form an overhang portion 40 which extends outwardly beyond the bobbin body 28a.

Between the parallel frame members 30 and 31 a back bar receiving portion 46 is formed, in which the back bars 5a and 5b are housed. Facing the back bar receiving portion 46, each of the parallel frame members 30 or 31 includes a protrusion 35 or 36 formed therein. These protrusions 35 and 36 function to hold and position the back bars.

The orthogonal frame member 32 includes three terminals 37, 38 and 39 insert molded therein which extend outwardly and laterally beyond the orthogonal frame member 32. Each of the three terminals 37, 38 or 39 is bent at its intermediate part to form a crank, and has an outer end forming a soldering portion 37a, 38a or 39a which is to be soldered to a wiring sheet described later. A recording coil 41 is wound about the bobbin body 28a, with the conductor wire thereof connected to the terminals 37, 38 and 39. The recording/reproducing coil assembly 3 thus formed is asymmetric relative to the core tip center line T in the presence of the overhang portion 40. When such a recording/reproducing coil assembly 3 is received in the coil assembly receiving portion 27 of the slider 2, the overhang portion 40 is positioned on the inner face of the auxiliary sliding face 15 and also within the range of the slider plane projection line C, except the terminals 37, 38 and 39.

The erasing coil assembly 4 is linearly symmetrical relative to the recording/reproducing coil assembly 3 about a center line S shown in FIG. 9. The erasing coil assembly 4 comprises a coil bobbin 28, a bore 29 in the coil core, parallel frame members 30 and 31, a back bar receiving portion 46, an orthogonal frame member 32, a reinforcing beam 34, an overhang portion 40 and protrusions 35 and 36. The coil core includes a bore 29 formed therethrough for receiving the leg 9a of the outer core 9 in the erasing core 7 of the composite magnetic core 1. The orthogonal frame member 32 includes three terminals 42, 43 and 44 insert molded therein which extend outwardly and laterally beyond the orthogonal frame member 32. Each of the three terminals 42, 43 or 44 is bent at its intermediate part to form a crank and has an outer end forming a soldering portion 42a, 43a or 44a which is to be soldered to a wiring sheet described later.

An erasing coil 45 is wound about the coil bobbin body 28, with the coil wire thereof connected to the terminals 42 and 44. The erasing coil assembly 4 thus formed is asymmetrical relative to the core tip center line T in the presence of the overhang portion 40. When such an erasing coil assembly 4 is received in the coil assembly receiving portion 26 of the slider 2, the overhang portion 40 is positioned on the inner face of the auxiliary sliding face 15 and also within the range of the slider plane projection line C, except the terminals 42, 43 and 44.

The composite magnetic core 1 is inserted into the core slit 17 of the slider 1 and fixedly positioned in the slider 1 using a molten glass to provide the complete sliding faces. The recording/reproducing coil assembly 3 is housed in the coil assembly receiving portion 27 while the erasing coil assembly 4 is received in the coil assembly receiving portion 26. In such a case, the leg 8a of the composite magnetic core 1 is inserted into the bore 29 in the coil bobbin 28 of the recording/reproducing coil assembly 3 while the leg 9a of the composite magnetic core 1 is inserted into the bore 29 in the coil bobbin 28 of the erasing coil assembly 4.

The back bars 5a and 5b are housed within the back bar receiving portions 24 and 25, respectively. The opposite ends of each of the back bars 5a and 5b are held between the corresponding protrusions 35 or 36 and the legs 8a, 9a of the recording/reproducing and erasing cores 6, 7.

After a shield member 51 is mounted on the periphery of the magnetic head body G thus formed as shown in FIGS. 11 to 14, the magnetic head body G is mounted on the gimbal spring 48 having openings 49 through which the terminals 37, 38, 39 and 42, 43, 44 extend outwardly beyond the magnetic head body G. The soldering portions 37a, 38a, 39a and 42a, 43a, 44a of these terminals are soldered to the respective contact patterns 50 in the wiring sheet 47. Thus, the magnetic head is completed.

Since the terminals 37–39 and 42–44 will not extend toward the inner faces of the wiring sheet and gimbal spring 47, 48, the magnetic head can be reduced in thickness.

The back bars 5a and 5b preferably have a rigidity sufficiently lower than those of the core legs and other components such that the core legs 8a, 9a and inner cores 10, 11 in the composite magnetic core 1 will not be broken. At the same time, The back bars 5a and 5b are of a cross-sectional area required to suppress increase of the magnetic reluctance. The magnetic resistances $R_I$ and $R_B$ of the 1 bar and back bar in the recording/reproducing core will be studied below.

Figure 6:
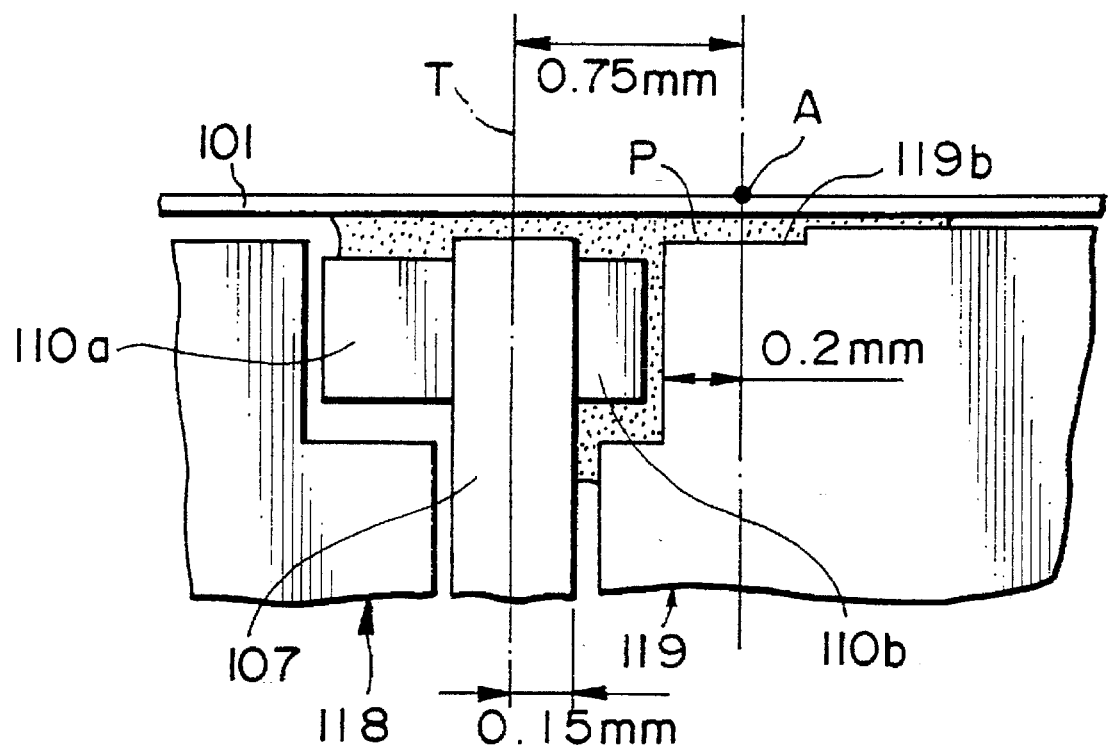
FIG. 6 is a view illustrating the relative relationship between the magnetic core, noses, back bars and head center in the magnetic head according to the prior art.

With a magnetic head for 3.5 inch-1 MB media, the distance from the center of the recording/reproducing gap to the center A of the magnetic head is equal to 0.75 mm, as shown in FIG. 6. The distance from the center A of the magnetic head to the step 4c of the nose 4c is equal to 0.2 mm at minimum. Since a clearance between this outer end and the back bar is required to be 0.1 mm at minimum, The thickness $t_B$ of the back bar will be smaller than 0.75-0.2-0.1-$t_c$/2. Since $t_c$ is equal to about 0.3 mm, $t_B$ will be smaller than $t_c$. This means that if the thickness of the back bar is equal to or larger than $t_c$, a notch must be formed. From the viewpoint of machining, it is desirable to provide a rectangular solid having no notch. It is therefore appropriate to provide a rectangular solid having a uniform thickness $t_B$ and a relationship of $t_B < t_c$.

It is further preferable that the magnetic reluctance in the two back bars is equal to or lower than the magnetic reluctance of the inner cores 10 and 11, which is the maximum among those of the other cores forming the magnetic circuit. Thus, the relationship of $0.5 t_c < t_B$ is established.

As will be apparent from the foregoing, it is suitable that the relationship of $0.5 t_c < t_B < t_c$ be established between the thickness $t_B$ of the back bar and the thickness $t_c$ of the composite magnetic core.

Since there is no opening below the parallel frame members 30 and 31, the bobbin 10 can be more easily molded, leading to prolongation of the life of the mold. Furthermore, the rigidity of the parallel frame members 30 and 31 can be increased. If the fit allowance is relatively large, then when the back bars 5a and 5b are assembled into the magnetic head, the coil bobbins 28 will not be damaged since the thinner back bars 5a and 5b tend to be broken earlier. This is advantageous from the viewpoint of manufacturing cost.

Figure 15:
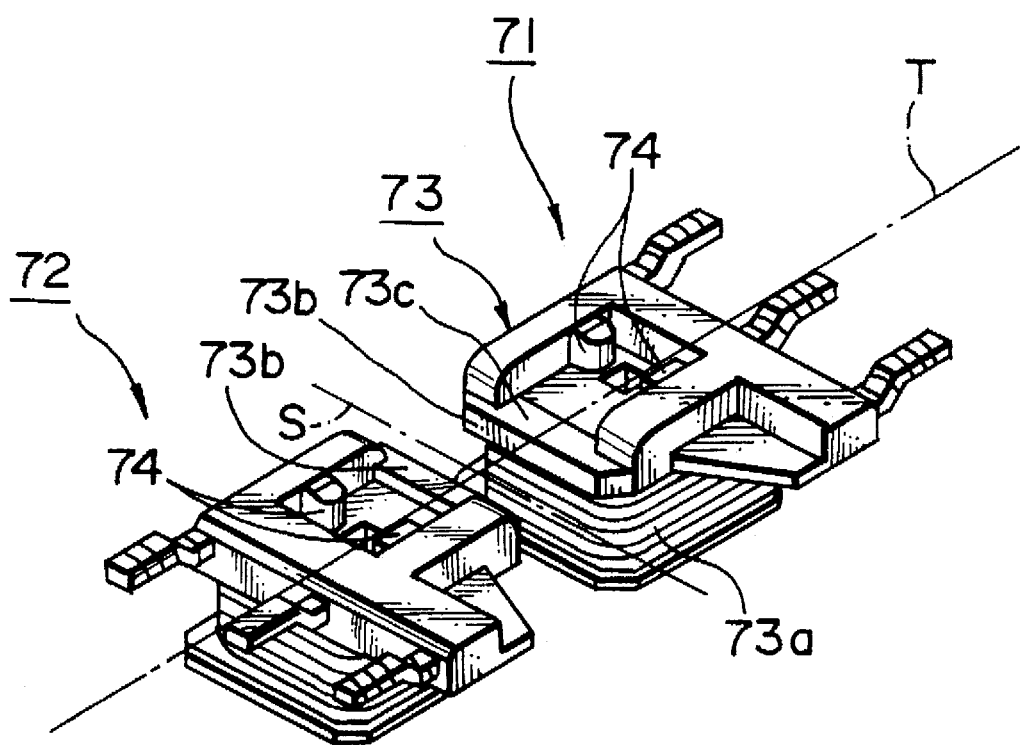
FIG. 15 is a schematic and perspective view of another embodiment of coil assemblies constructed according to the present invention.

FIG. 15 shows another embodiment of coil assemblies constructed in accordance with the present invention. As in the previous embodiment, recording/reproducing and erasing coil assemblies 71 and 72 are symmetrically disposed about the center line S of the head. Since these coil assemblies are of the same structure, only the recording/reproducing coil assembly 71 will be described, and the erasing coil assembly 72 will not further be described. The recording/reproducing coil assembly 71 comprises a coil bobbin 73 which has substantially the same configuration as in the coil bobbin 28 of the previous embodiment as shown in FIG. 8 and so on. However, the coil bobbin 73 is distinguished from the coil bobbin 28 in that the bobbin body 73a thereof has a step 73c formed therein at the inner face 73b opposite to the inner wall of the magnetic head. The height of this step is equal to about 0.1 mm. When the back bars 5a and 5b are inserted into the magnetic head, they are engaged by the step 73c to form a gap between the inner face 73b of the bobbin body and the back bars. Even if the tops of the protrusions 74 are shaved when the back bars 5a and 5b are inserted into the magnetic head, the shavings can be removed using said gap without disturbance of the insertion of back bar. The back bars 5a and 5b are adhered to the magnetic core through silver paste while the shavings are held by the silver paste. As described, the coil bobbin 73 is of the same configuration as that of the coil bobbin 28 except the step 73c in the bobbin body 73b. Therefore, the coil bobbin 73 can provide the same advantages as in the coil bobbin 28 of the previous embodiment.

We claim:

1. A magnetic head for recording data on a magnetic recording medium and reading the recorded data from the magnetic recording medium, said magnetic head comprising:

a magnetic core having gaps formed along a direction transversing the longitudinal axis of the magnetic core;

a slider having a main sliding face brought into sliding contact with a magnetic recording medium and fixedly supporting the magnetic core with said gaps thereof being exposed through the main sliding face;

a coil through which part of the magnetic core is passed; and a coil bobbin for holding the coil, said coil bobbin comprising:

a bobbin body holding the coil;

two parallel frame members formed in the bobbin body on the side opposite to the magnetic recording medium and disposed on the opposite sides of the magnetic core to extend parallel to each other in the longitudinal direction of said magnetic core and to be spaced away from each other;

an orthogonal frame member formed to extend in a transverse direction perpendicular to the longitudinal direction of the magnetic core and located in contact with end portions of the two parallel frame members, the orthogonal frame member having, at only one end, an extension extending beyond the two parallel frame members in a direction away from the magnetic core;

said parallel frame members terminating at end portions located opposite said orthogonal frame member;

reinforcing beam located between the extension of said orthogonal frame member and one of said parallel frame members; and terminals formed to extend from the orthogonal frame member and wound by the ends of the coil conductor wires, said coil bobbin being substantially entirely housed within said slider with respect to both the longitudinal and transverse directions of said magnetic core except said terminals.

2. A magnetic head as defined in claim 1 wherein said terminals are formed at least the opposite ends of said orthogonal frame member to extend beyond said orthogonal frame member in the longitudinal direction of the magnetic core.

3. A magnetic head as defined in claim 2 wherein the terminals are bent toward the side of the coil bobbin opposite the magnetic recording medium.

4. A magnetic head as defined in claim 3 wherein and portions of said terminals located opposite said magnetic held are disposed parallel to the main sliding face of said slider.

5. A magnetic head as defined in claim 1, further comprising two back bars disposed on opposite sides of said magnetic core and closing the open portion of the magnetic core and wherein each of said back bars has a cross-section which is uniform along the length thereof said back bars being parallel and co-extensive.

6. A coil bobbin used in a magnetic head and operative to produce a magnetic field in a magnetic core of said magnetic head for recording data into a magnetic recording medium and reading the recorded data from the magnetic recording medium, said coil bobbin functioning to hold a coil for detecting the magnetic field produced by said magnetic core, said coil bobbin comprising:

a bobbin body for holding said coil, said bobbin body having a bore through which part of said magnetic core passes;

two parallel frame members formed on one end surface of said bobbin body and disposed on the opposite sides of said bore;

an orthogonal frame member formed to extend in a direction perpendicular to said parallel frame members and located in contact with the end faces of said parallel frame members, said orthogonal frame member extending, at only one end, beyond said parallel frame members in a direction away from the magnetic core;

said parallel frame members terminating at end portions located opposite said orthogonal frame member:

a reinforcing beam formed between said orthogonal frame member and one of said parallel frame members; and terminals formed to extend beyond said orthogonal frame member and wound by the ends of the conductor wires in said coil.

7. A coil bobbin as defined in claim 6, wherein said terminals extend from said orthogonal frame member in a direction perpendicular to said bore.

8. A coil bobbin as defined in claim 7 wherein said terminals are bent toward said bore in the direction opposite to said bobbin body and further bent in the direction perpendicular to said bore.

9. A magnetic head for recording data on a magnetic recording medium and reading the recorded data from the magnetic recording medium, said magnetic head comprising:

a magnetic core having gaps formed along a direction transversing the longitudinal axis of the magnetic core;

a slider having a main sliding face brought into sliding contact with a magnetic recording medium and fixedly supporting the magnetic core with said gaps thereof being exposed through the main sliding face;

a coil through which part of the magnetic core is passed; and a coil bobbin for holding the coil, said coil bobbin comprising:

a bobbin body holding the coil;

two parallel frame members formed in the bobbin body on the side opposite to the magnetic recording medium and disposed on the opposite sides of the magnetic core to extend parallel to each other in the longitudinal direction of said magnetic core and to be spaced away from each other;

an orthogonal frame member formed to extend in a transverse direction perpendicular to the longitudinal direction of the magnetic core and located in contact with end portions of the two parallel frame members, the orthogonal frame member having, at only one end, an extension extending beyond the two parallel frame members in a direction away from the magnetic core;

terminals formed to extend from the orthogonal frame member and wound by the ends of the coil conductor wires; and two back bars disposed on the opposite sides of said magnetic core and closing the open portion of the magnetic core and wherein each of said back bars has a cross-section which is uniform along the length thereof and the thickness of each of said back bars in the transverse direction of the magnetic core is less than the thickness of the magnetic core in the transverse direction thereof, but exceeds one-half of the thickness of the magnetic core in the transverse direction thereof;

said coil bobbin being substantially entirely housed within said slider with respect to both the longitudinal and transverse directions of said magnetic core except said terminals.

10. A magnetic head for recording data in a magnetic recording medium and reading the recorded data from the magnetic recording medium, said magnetic head comprising:

a magnetic core having gaps formed along a direction transversing the longitudinal axis of the magnetic core;

a slider having a main sliding face brought into sliding contact with a magnetic recording medium, said slider fixedly supporting said magnetic core with said gaps thereof being exposed at the main sliding face;

a coil through which part of the magnetic core passes;

a coil bobbin for holding said coil; and two back bars for magnetically closing an open end of said magnetic core and for holding said magnetic core, each of said back bars being in the form of a rectangular solid having a uniform cross-sectional configuration in the longitudinal direction wherein the thickness of said back bars in the transverse direction of the magnetic core is less than the thickness of the magnetic core in the transverse direction thereof, but exceeds one-half of the thickness of the magnetic core in the transverse direction thereof.

11. A magnetic head as defined in claim 10 wherein the two back bars are of the same configuration.

* * * * *